(12) United States Patent
Forssell et al.

(10) Patent No.: US 9,001,652 B2
(45) Date of Patent: *Apr. 7, 2015

(54) METHOD AND ARRANGEMENT FOR TRANSFERRING INFORMATION IN A PACKET RADIO SERVICE

(71) Applicant: Intellectual Ventures I LLC, Wilmington (DE)

(72) Inventors: Mika Forssell, Soderkulla (FI); Janne Parantainen, Helsinki (FI)

(73) Assignee: Intellectual Ventures I LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/974,707

(22) Filed: Aug. 23, 2013

(65) Prior Publication Data

US 2014/0056133 A1 Feb. 27, 2014

Related U.S. Application Data

(63) Continuation of application No. 13/474,085, filed on May 17, 2012, now Pat. No. 8,531,949, which is a continuation of application No. 12/359,763, filed on Jan. 26, 2009, now Pat. No. 8,213,304, which is a (Continued)

(30) Foreign Application Priority Data

Nov. 27, 1998 (FI) .......................................... 982577

(51) Int. Cl.
*H04L 12/26* (2006.01)
*H04W 28/26* (2009.01)

(Continued)

(52) U.S. Cl.
CPC ............ *H04W 28/26* (2013.01); *H04W 76/028* (2013.01); *H04W 76/041* (2013.01); *H04W 76/045* (2013.01); *H04W 72/04* (2013.01)

(58) Field of Classification Search
CPC ... H04W 28/26; H04W 76/02; H04W 76/028; H04W 76/041; H04W 76/045; H04W 76/048; H04W 72/04
USPC ......... 370/229–230, 328–329, 337, 347–348, 370/352–356, 389, 477; 455/452.1–452.2, 455/455

See application file for complete search history.

(56) References Cited

U.S. PATENT DOCUMENTS 4,251,865 A 2/1981 Moore et al.
4,383,315 A 5/1983 Torng (Continued)

FOREIGN PATENT DOCUMENTS

EP 0 496 390 7/1992
EP 0 642 283 3/1995

(Continued)

OTHER PUBLICATIONS

Communication from European Patent Office for European Application 99308864.0, dated Apr. 29, 2010.

(Continued)

*Primary Examiner* — Kevin Mew

(57) ABSTRACT

A method and an arrangement for transferring information including delay sensitive data, such as speech and video data, in a packet radio service is provided. Data blocks are transmitted from a mobile station to a radio resource entity during a first active data transfer period using an uplink temporary block flow (TBF) connection. The uplink TBF connection is maintained during a passive period that follows the first active data transfer period, wherein during the passive period the mobile station does not send data blocks to the radio resource entity.

20 Claims, 8 Drawing Sheets

Related U.S. Application Data continuation of application No. 10/699,162, filed on Oct. 31, 2003, now Pat. No. 7,564,784, which is a continuation of application No. 09/447,988, filed on Nov. 23, 1999, now Pat. No. 6,671,511.

(51) Int. Cl.
*H04W 76/02* (2009.01)
*H04W 76/04* (2009.01)
*H04W 72/04* (2009.01)

(56) References Cited

U.S. PATENT DOCUMENTS

| | | | |
|---|---|---|---|
| 4,887,265 A | 12/1989 | Felix | |
| 5,023,604 A | 6/1991 | Takase et al. | |
| 5,392,286 A | 2/1995 | Tanaka et al. | |
| 5,708,656 A | 1/1998 | Noneman et al. | |
| 5,745,695 A | 4/1998 | Gilchrist et al. | |
| 5,768,350 A | 6/1998 | Venkatakrishnan | |
| 5,883,893 A | 3/1999 | Rumer et al. | |
| 6,320,873 B1 | 11/2001 | Nevo et al. | |
| 6,330,451 B1 | 12/2001 | Sen et al. | |
| 6,374,112 B1 | 4/2002 | Widegren et al. | |
| 6,412,006 B2 | 6/2002 | Naudus | |
| 6,473,419 B1 | 10/2002 | Gray et al. | |
| 6,490,271 B1 | 12/2002 | Erjanne | |
| 6,671,511 B1 | 12/2003 | Forssell et al. | |
| 6,678,262 B1 | 1/2004 | Sydon et al. | |
| 6,697,604 B1 | 2/2004 | Rimpela et al. | |
| 6,751,456 B2 | 6/2004 | Bilgic | |
| 6,772,112 B1 | 8/2004 | Ejzak | |
| 6,813,252 B2 | 11/2004 | Chang et al. | |
| 6,891,818 B1 | 5/2005 | Jarvisalo et al. | |
| 6,920,121 B2 | 7/2005 | Tan | |
| 6,996,083 B1 | 2/2006 | Balachandran et al. | |
| 7,068,623 B1 * | 6/2006 | Barany et al. | 370/329 |
| 7,106,714 B2 | 9/2006 | Spear et al. | |
| 7,123,595 B2 | 10/2006 | Hautamaki et al. | |
| 7,130,635 B2 | 10/2006 | Cerwall et al. | |
| 7,149,245 B2 | 12/2006 | Budka et al. | |
| 7,181,223 B1 * | 2/2007 | Pecen et al. | 455/452.1 |
| 7,417,966 B2 | 8/2008 | Kalden et al. | |
| 7,564,784 B2 * | 7/2009 | Forssell et al. | 370/230 |
| 8,213,304 B2 * | 7/2012 | Forssell et al. | 370/230 |
| 8,531,949 B2 * | 9/2013 | Forssell et al. | 370/230 |
| 2004/0090948 A1 | 5/2004 | Forssell et al. | |
| 2004/0120302 A1 | 6/2004 | Sebire et al. | |
| 2005/0180325 A1 | 8/2005 | Niemela et al. | |
| 2005/0255872 A1 | 11/2005 | Lundell et al. | |
| 2006/0165027 A1 | 7/2006 | Heden | |
| 2006/0221896 A1 | 10/2006 | Vaittinen et al. | |
| 2007/0001007 A1 | 1/2007 | Koenck et al. | |

FOREIGN PATENT DOCUMENTS

| | | |
|---|---|---|
| EP | 0 817 427 | 1/1998 |
| EP | 0 959 589 | 11/1999 |
| EP | 0 959 634 | 11/1999 |
| JP | 05-183499 | 7/1993 |
| JP | 09-036909 | 2/1997 |
| JP | 09-205667 | 8/1997 |
| JP | 09-205668 | 8/1997 |
| WO | WO-96/27964 | 9/1996 |
| WO | WO-96/33562 | 10/1996 |
| WO | WO-97/15154 | 4/1997 |
| WO | WO-97/15155 | 4/1997 |
| WO | WO-97/15168 | 4/1997 |
| WO | WO-97/34430 | 9/1997 |
| WO | WO-98/37706 | 8/1998 |
| WO | WO 98/42111 | 9/1998 |
| WO | WO-98/44640 | 10/1998 |
| WO | WO-99/12362 | 3/1999 |

OTHER PUBLICATIONS

EPO notice of opposition against patent EP1006695 dated Dec. 7, 2007.
ETSI Draft EN 301 349 v6. 1.0 (Aug. 1998), "Digital cellular telecommunications system (Phase 2 ); General Packet Radio Service (GPRS); Mobile Station (MS)—Base Station System (BSS) interface; Radion Link Control/Medium Access Control (RLC/MAC) protocol" (GSM 04.60 version 6.1.0 Release 1997), published on Aug. 21, 1998.
European Search Report for EPO application 99308864.0 dated Feb. 29, 2000.
European Telecommunications Standards Institute, "Draft EN 301 349 V6.1.0 (Aug. 1998): Digital cellular telecommunications system (Phase 2+); General Packet Radio Service (GPRS); Mobile Station (MS)—Base Station System (BSS) interface; Radio Link Control / Medium Access Control (RLC/MAC) protocol (GSM 04.60 version 6.1.0 Release 1997)", Aug. 21, 1998.
European Telecommunications Standard Institute, "TS 100 552 V6.0.0 (Aug. 1998): Technical Specification: Digital cellular telecommunications system (Phase 2+); Mobile Station (MS)—Base Station System (BSS) interface; Channel structures and access capabilities (GSM 04.03 version 6.0.0 Release 1997)", Aug. 1998.
European Telecommunications Standards Institute, "TS 100 908 V6.2.0 (Jul. 1998): Technical Specification: Digital cellular telecommunications system (Phase 2+); Multiplexing and multiple access on the radio path (GSM 05.02 version 6.2.0 Release 19970", Jul. 1998.
European Telecommunications Standards Institute, "TS 101 113 V5.2.0 (Jan. 1998): Technical Specification: Digital cellular telecommunications system (Phase 2+); General Packet Radio Service (GPRS); Service descriptions; Stage 1 (GSM 02.60 vresion 5.2.0)", Jan. 1998.
European Telecommunications Standards Institute, "TS 101 350 V6.0.1 (Aug. 1998) Technical Specification: Digital cellular telecommunications system (Phase 2+); General Packet Radio Service (GPRS); Overall description of the GPRS radio interface; Stage 2 (GSM 03.64 version 6.0.1 Release 1997)", Aug. 1998.
International Search Report for PCT/FI99/00980 mailed on May 18, 2000.
Non-Final Office Action on U.S. Appl. No. 10/699,162, mailed Jun. 26, 2007.
Non-Final Office Action on U.S. Appl. No. 12/359,763, mailed Jul. 8, 2011.
Non-Final Office Action on U.S. Appl. No. 13/474,085, mailed Oct. 9, 2012.
Notice of Allowance on U.S. Appl. No. 10/699,162, mailed Oct. 29, 2008.
Notice of Allowance on U.S. Appl. No. 12/359,763, mailed Feb. 6, 2012.
Notice of Allowance on U.S. Appl. No. 13/474,085; mailed May 13, 2013.
Office Action from EPO application 99308864.0 dated Apr. 5, 2006.
Office Action from Japanese Patent Application 336821/1999 dated Feb. 20, 2007.
Written Opinion for PCT/FI99/00980 mailed on Nov. 15, 2000.

* cited by examiner

METHOD AND ARRANGEMENT FOR TRANSFERRING INFORMATION IN A PACKET RADIO SERVICE

CROSS-REFERENCE TO RELATED PATENT APPLICATIONS

This application is a continuation of U.S. patent application Ser. No. 13/474,085, filed May 17, 2012, which is a continuation of U.S. patent application Ser. No. 12/359,763 that was filed Jan. 26, 2009 (now U.S. Pat. No. 8,213,304), which is a continuation of U.S. patent application Ser. No. 10/699,162 that was filed Oct. 31, 2003, (now U.S. Pat. No. 7,564,784), which is a continuation of U.S. patent application Ser. No. 09/447,988 that was filed Nov. 23, 1999, now U.S. Pat. No. 6,671,511, the disclosures of which are incorporated by reference. U.S. patent application Ser. No. 09/447,988 claims priority under the Paris Convention to Finland Patent Application No 982577, filed Nov. 27, 1998, the disclosure of which is incorporated by reference in its entirety

BACKGROUND

The disclosure relates generally to a method and an arrangement for transferring information in a packet radio service. Especially the invention applies to transferring delay sensitive data, such as speech and video data, in a mobile telecommunications system.

The denomination "mobile telecommunications system" refers generally to any telecommunications system which enables a wireless communication connection between a mobile station (MS) and the fixed parts of the system when the user of the mobile station is moving within the service area of the system. A typical mobile communications system is a Public Land Mobile Network (PLMN). The majority of mobile telecommunications systems in use at the time of the filing of this patent application belong to the second generation of such systems, a well-known example being the GSM system (Global System for Mobile telecommunications). However, the invention also applies to the next or third generation of mobile telecommunications systems, such as a system known as the UMTS (Universal Mobile Telecommunications System) which currently undergoes standardisation.

Internet real time services have gained popularity during the past few years. IP (Internet Protocol) telephony and different streaming applications are already common in the Internet. Also the demand for wireless access to these real time services is expected to be still growing. Packet switched wireless networks, such as GPRS (General Packet Radio Service), are designed to provide data services, e.g. Internet services, cost effectively. In GPRS the channels are not dedicated for one user continuously but are shared between multiple users. This facilitates efficient data multiplexing. However, GPRS is not originally designed for transferring delay sensitive real time data, e.g. IP telephony sessions. For this reason, GPRS contains various technical solutions that do not meet the requirements set by real time traffic. In the following text, a denomination "delay sensitive data" is used for data flows that should be transferred on real time basis and that may have passive periods during which the data flow is suspended.

FIG. 1A shows a version of a future cellular radio system which is not entirely new compared to the known GSM system but which includes both known elements and completely new elements. The terminals are connected to the radio access network RAN which includes the base stations and the base station controllers. The core network of a cellular radio system comprises mobile services switching centres (MSC), other network elements (in GSM, e.g. SGSN and GGSN, i.e. Serving GPRS Support Node and Gateway GPRS Support node, where GPRS stands for General Packet Radio Service) and related transmission systems. According, e.g. to the GSM+ specifications developed from GSM, the core network can also provide new services.

In FIG. 1A, the core network of a cellular radio system 10 comprises a GSM+ core network 11 which has three parallel radio access networks linked to it. Of those, networks 12 and 13 are UMTS radio access networks and network 14 is a GSM+ radio access network. The upper UMTS radio access network 12 is, e.g. a commercial radio access network, owned by a telecommunications operator offering mobile services, which equally serves all subscribers of said telecommunications operator. The lower UMTS radio access network 13 is, e.g. private and owned e.g. by a company in whose premises said radio access network operates. Typically the cells of the private radio access network 13 are nano- and/or picocells in which only terminals of the employees of said company can operate. All three radio access networks may have cells of different sizes offering different types of services. Additionally, cells of all three radio access networks 12, 13 and 14 may overlap either entirely or in part. The bit rate used at a given moment of time depends, among other things, on the radio path conditions, characteristics of the services used, regional overall capacity of the cellular system and the capacity needs of other users. The new types of radio access networks mentioned above are called generic radio access networks (GRAN). Such a network can co-operate with different types of fixed core networks CN and especially with the GPRS network of the GSM system. The generic radio access network (GRAN) can be defined as a set of base stations (BS) and radio network controllers (RNC) that are capable of communicating with each other using signaling messages.

FIG. 1B shows an architecture of a general packet radio service (GPRS). The GPRS is a new service that is currently based on the GSM system but it is supposed to be generic in the future. GPRS is one of the objects of the standardisation work of the GSM phase 2+ and UMTS at the ETSI (European Telecommunications Standards Institute). The GPRS operational environment comprises one or more subnetwork service areas, which are interconnected by a GPRS backbone network. A subnetwork comprises a number of packet data service nodes (SN), which in this application will be referred to as serving GPRS support nodes (SGSN) 153, each of which is connected to the mobile telecommunications system (typically to a base station through an interworking unit) in such a way that it can provide a packet service for mobile data terminals 151 via several base stations 152, i.e. cells. The intermediate mobile communication network provides packet-switched data transmission between a support node and mobile data terminals 151. Different subnetworks are in turn connected to an external data network, e.g. to a Public Data Network (PDN) 155, via GPRS gateway support nodes GGSN 154. The GPRS service thus allows the provision of packet data transmission between mobile data terminals and external data networks when the appropriate parts of a mobile telecommunications system function as an access network.

In order to access the GPRS services, a mobile station shall first make its presence known to the network by performing a GPRS attachment. This operation establishes a logical link between the mobile station and the SGSN, and makes the mobile station available for SMS (Short Message Services) 158, 159, over GPRS, paging via SGSN, and notification of incoming GPRS data. More particularly, when the mobile station attaches to the GPRS network, i.e. in a GPRS attachment procedure, the SGSN creates a mobility management context (MM context). Also the authentication of the user is carried out by the SGSN in the GPRS attachment procedure. In order to send and receive GPRS data, the MS shall activate the packet data address wanted to be used, by requesting a PDP activation procedure (Packet Data Protocol). This operation makes the mobile station known in the corresponding GGSN, and interworking with external data networks can commence. More particularly, a PDP context is created in the mobile station and the GGSN and the SGSN. The packet data protocol context defines different data transmission parameters, such as the PDP type (e.g. X.25 or IP), the PDP address (e.g. X.121 address), the quality of service (QoS) and the NSAPI (Network Service Access Point Identifier). The MS activates the PDP context with a specific message, Activate PDP Context Request, in which it gives information on the TLLI, the PDP type, the PDP address, the required QoS and the NSAPI, and optionally the access point name (APN).

FIG. 1B also shows the following GSM functional blocks: Mobile Switching Center (MSC)/Visitor Location Register (VLR) 160, Home Location Register (HLR) 157 and Equipment Identity Register (EIR) 161. The GPRS system is usually also connected to other Public Land Mobile Networks (PLMN) 156.

Functions applying digital data transmission protocols are usually described as a stack according to the OSI (Open Systems Interface) model, where the tasks of the various layers of the stack, as well as data transmission between the layers, are exactly defined. In the GSM system phase 2+, which in this patent application is observed as an example of a digital wireless data transmission system, there are five operational layers defined.

Relations between the protocol layers are illustrated in FIG. 2. The lowest protocol layer between the mobile station MS and the base station subsystem is the layer 1 (L1) 200, 201, which corresponds to a physical radio connection. Above it, there is located an entity corresponding to the layers 2 and 3 of a regular OSI model, wherein the lowest layer is a radio link control/media access control (RLC/MAC) layer 202, 203; on top of it a logical link control (LLC) layer 204, 205; and topmost a radio resource control (RRC) layer 206, 207. Between the base station subsystem UTRA BSS of the generic radio access network and an interworking unit/core network IWU/CN located in the core network, there is assumed to be applied a so-called Iu interface, where the layers corresponding to the above described layers from L1 to LLC are the layers L1 and L2 of the OSI model (blocks 208 and 209 in the drawing), and the layer corresponding to the above described RRC layer is the layer L3 of the OSI model (blocks 210 and 211 in the drawing).

The mobile station MS must include a higher-level control protocol 212 and a protocol 213 for serving higher-level applications, of which the former communicates with the RRC layer 206 in order to realize control functions connected to data transmission connections, and the latter communicates directly with the LLC layer 204 in order to transmit such data that directly serves the user (for instance digitally encoded speech). In a mobile station of the GSIVI system, the blocks 212 and 213 are included in the above mentioned NIM layer.

In GPRS, a Temporary Block Flow (TBF) is created for transferring data packets on a packet data channel. The TBF is a physical connection used by the two Radio Resource (RR) peer entities to support the unidirectional transfer of Logical Link Control (LLC) Packet Data Units (PDU) on packet data physical channels. The TBF is normally always released when there is no data to be transmitted. This is a problem in voice services because there are silent periods in between active periods.

During these silent or "passive" periods no data is transferred and the TBF is thus released. The TBF setup procedure is likely to be too long in order to be set up fast enough when the active period continues.

An example of the resource allocation in the GPRS of the current GSM Phase 2+ specification is next described in more detail.

In the GSM Phase 2+ the uplink resource allocation is currently specified as follows. The Mobile Station (MS) requests uplink radio resources by sending a PACKET CHANNEL REQUEST message to the network. Various access type values are specified for the request message. For data transfer 'one phase access', 'two phase access' and 'short access' access type values are defined. Using 'short access' access type value, the MS may request the radio resources to transfer only few RLC data blocks, and therefore it is not applicable for transferring continuous data flows.

When a network receives a PACKET CHANNEL REQUEST message indicating one phase access, it may allocate radio resources on one or several Packet Data CHannels (PDCH). The allocation is based on information included in the request message. The following table shows an example for an 11 bit message content of a PACKET CHANNEL REQUEST message:

| bits | |
|---|---|
| 11 10 9 8 7 6 5 4 3 2 1 | Packet Channel Access |
| 0 mmmmm pp r r r | One Phase Access Request |
| 1 0 0 n n n pp r r r | Short Access Request |
| 1 1 0 0 0 0 pp r r r | Two Phase Access Request |
| 1 1 0 0 0 1 r r r r r | Page Response |
| 1 1 0 0 1 0 r r r r r | Cell update |
| 1 1 0 0 1 1 r r r r r | Mobility Management procedure |
| 1 1 0 1 0 0 r r r r r | Measurement Report |
| All others | Reserved |

An 11 bit PACKET CHANNEL REQUEST message indicating one phase access has a field of 5 bits describing the multislot class of the mobile station, a field of two bits indicating requested priority and a field of three bits describing random reference (random mobile station identification information).

The following table shows an example for an 8 bit message content of a PACKET CHANNEL REQUEST message:

| bits | |
|---|---|
| 8 7 6 5 4 3 2 1 | Packet Channel Access |
| 1 mmmmm r r | One Phase Access Request |
| 0 0 n n n r r r | Short Access Request |
| 0 1 0 0 0 r r r | Two Phase Access Request |
| 0 1 0 0 1 r r r | Page Response |
| 0 1 0 1 0 r r r | Cell Update |
| 0 1 0 1 1 r r r | Mobility Management procedure |
| 0 1 1 0 0 r r r | Measurement Report |
| All others | Reserved |

An 8 bit Packet Channel Request message indicating one phase access has a field of bits describing the multislot class of the mobile station and a field of two bits describing random reference. The information about the allocated radio resources is sent to the Mobile Station with a PACKET UPLINK ASSIGNMENT message.

When a network receives a PACKET CHANNEL REQUEST message indicating two phase access, it may allocate limited radio resources on one packet data channel. The allocated radio resources are transmitted to the mobile station with a PACKET UPLINK ASSIGNMENT message. After this the mobile station transmits a PACKET RESOURCE REQUEST message to the network by using the allocated radio resources. The message defines more accurately the required radio resources, e.g. requested bandwidth and priority, and the radio capability of the mobile station. Based on the information received in the PACKET RESOURCE REQUEST message, the network may assign one or several packet data channels to the TBF and informs the assigned radio resources to the mobile station with a PACKET UPLINK ASSIGNMENT message.

Above, the request of resources was made using the GPRS control channel as an example. There are also other ways of requesting resources in case the cell does not include a GPRS control channel (even if it supports GPRS). In this case the resource request can be made using a GSM control channel.

In the prior art uplink radio resource allocation the following problems may arise:

If the priority field included into the PACKET CHANNEL REQUEST and the PACKET RESOURCE REQUEST Request messages does not unambiguously define delay sensitive real time traffic, the network might not be able to provide the needed radio resources for the MS. Thus, e.g. transferring speech using the GPRS might not reach a sufficient quality.

The default RLC mode is an acknowledged mode in one phase access. Since real time traffic would be transferred using unacknowledged RLC mode, two phase access should be used. Using two phase access, additional radio resource request information may be given to the network. However, two phase access causes additional delay to channel assignment procedure, because the mobile station has to send two request messages to the network instead of one. In spite of the additional radio resource request information it is not guaranteed that the network is able to provide the needed radio resources for the mobile station transferring delay sensitive real time traffic.

When allocating radio resources for uplink transfer, downlink radio resources cannot be allocated simultaneously, because the downlink temporary block flow cannot be created without downlink packets. Thus it is possible that, when the mobile station then would receive a downlink packet, the network is unable to assign radio resources for the transfer of the packet.

Downlink radio resource allocation is currently specified as follows: When the network receives data for a mobile station which has no assigned radio resources and whose cell location is known, the network assigns radio resources on one or several packet data channels by transmitting a PACKET DOWNLINK ASSIGNMENT message to the mobile station. When the mobile station receives the assignment message, it starts listening allocated packet data channels for Radio Link Control (RLC) data blocks.

In downlink radio resource allocation, the following problems may arise:

If information attached to data (coming from the SGSN) does not unambiguously define delay sensitive real time traffic, the network may not be able to provide the needed downlink radio resources for the MS.

Also if there is need to transfer delay sensitive real time traffic to both directions, downlink and uplink, the mobile station may request uplink radio resources only when the network assigns sending permission to the mobile station. This may cause a delay of variable amount of time, such as several seconds.

When allocating radio resources for downlink transfer, uplink radio resources cannot be allocated simultaneously because the uplink temporary block flow cannot be created without uplink packets. Thus it is possible, that the mobile station requests uplink radio resources but the network is unable to assign the requested radio resources.

Uplink radio resource deallocation is currently specified as follows: Every uplink RLC data block includes a countdown value (CV) field. It is specified in [1] that the CV shall be 15 when the mobile station has more than BS CV MAX (broadcast parameter) RLC data blocks left to be transmitted to the network. Otherwise the mobile station indicates to the network the number of remaining RLC data blocks with the CV field. The last RLC data block shall be sent to the network with the CV value set to '0'. Specification [1] defines also that once the mobile station has sent a CV value other than '15', it shall not enqueue any new RLC data blocks meaning that the new RLC data blocks shall not be sent during the ongoing TBF. Once the network receives RLC data block with the CV field set to '0', the TBF release procedures are initiated.

In uplink radio resource deallocation, the following problems may arise:

If delay sensitive real time data is transferred over radio interface according to current GPRS rules, the mobile station will have to establish several TBFs per session, because during the passive periods the mobile station has no RLC data blocks to send to the network and thus the CV value '0' terminates the uplink TBF. Because the TBF setup procedure takes time, delay sensitive traffic cannot be transmitted with good quality. Also, there are no guarantees that free radio resources are always available when the mobile station requests uplink radio resources.

Downlink radio resource deallocation is currently specified as follows: Every downlink RLC data block includes a Final Block Indicator (FBI) field in the RLC header. The specification [1] defines that the network indicates to the mobile station the release of the downlink TBF by setting the FBI field to '1'. The network sets the FBI field to '1' when it has no more RLC data blocks to send to the mobile station. After receiving RLC data block with FBI field set to '1' the mobile station shall acknowledge to the network that it has received the FBI information. When the network receives the acknowledgement message, the TBF is released.

In downlink radio resource deallocation, the following problems may arise:

If delay sensitive real time traffic is transferred over radio interface according to current GPRS rules, the network would have to establish several TBFs per session, because during the passive periods the network has no RLC data blocks to send to the mobile station and thus the FBI value '1' terminates the downlink TBF. Also, there are no guarantees that free radio resources are always available when the network tries to allocate downlink radio resources.

Problems also occur in assigning uplink and downlink sending permissions:

If delay sensitive real time data traffic is transferred on packet data channel/channels (PDCH), it is not guaranteed that adequate sending permissions are given in order to transfer the data, because the current network may not have unambiguous knowledge about delay sensitive data being transferred.

A further problem with the prior art specification is related to the feature that the network assigns transmission permissions for uplink and downlink directions independently, i.e.

controls which mobile station receives data next and which mobile station may send data next. However, delay sensitive data, such as speech, has strict delay requirements. Consequently, whenever a delay sensitive data user has something to transmit, it must be able to do so in order to maintain an acceptable service level. If more than one users are allocated to the same packet data channel it is probable that at some point two or more users need to transmit simultaneously, and just one can be served on the channel. In speech conversations a large proportion of the connection time is silence. Thus it would be possible to statistically multiplex more than one speech user for one packet data channel. The GPRS channel reservation system, however, is not elaborate enough to support this need. Therefore only one user of delay sensitive data transfer can be allocated for one packet data channel, which means that the use of the channel capacity is not optimised.

When the network notices that a mobile station wants to send delay sensitive data in the uplink direction the network reserves as much uplink resources to the mobile station as is requested. This naturally requires that the network has the required resources available. This may mean that the packet data channel is dedicated temporarily for a single mobile station in the uplink direction. During passive periods in uplink delay sensitive data transfer the network may assign uplink sending permissions of the allocated channels for other mobile stations. Since the mobile station transferring delay sensitive data reserves the uplink capacity of the packet data channel, other mobile stations that are allocated to the same packet data channel can not be assigned a sending permission to find out, whether they have data to send in the uplink direction. Also, if more than one mobile station allocated to the same packet data channel would need to send delay sensitive data at the same time, only one could be served. Therefore the network is forced to restrict the number of mobile stations transferring delay sensitive data according to the number of packet data channels in order to provide acceptable service quality.

It is thus an object of this invention to provide a method and an arrangement that offers solutions to the prior art problems. Especially, it is an object of this invention to provide a solution, in which the physical connection of a packet radio service is kept reserved also during the passive periods of a session yet the same physical resource can still be shared between multiple users.

The objects of the invention are fulfilled by providing a procedure, in which a TBF may be kept functional also when there is a passive transfer period between the mobile station and the network. The procedure supports delay sensitive traffic while utilizing radio resources efficiently.

One idea of the invention is that the network is informed at the end of an active period, on whether a passive period follows the active period or if the connection can be released. The network may also be informed on whether the packet data channel can be assigned to other temporary block flows. The information can be transferred e.g. on the packet data channel during an active period or on a control channel at any time. On the packet data channel the information can be transferred e.g. in the MAC header field of a data block. Alternatively a separate signalling message can be used. With this information it is possible to keep the created temporary block flow available even when there is no data to be transmitted. When an active period starts after a passive period, the connection starts using the created TBF again, and possible other users of the packet data channel may be assigned to other channels.

In addition to transferring information between the mobile station and the network on whether a passive period follows the active period or if the connection can be released, there is also an alternative method: The network may use a timer function for determining whether a passive period follows the active period or if the connection can be released. In this alternative, when a predetermined time of inactive data transfer has passed, the TBF is released.

An object of the invention is also fulfilled with the idea of allocating several delay sensitive data flows to the same packet data channel. On an uplink channel, after one mobile station starts to transmit, the other mobile stations may be reallocated to other channels immediately or a transmission permit can be periodically allocated to the mobile stations so that the mobile stations may indicate their willingness to transfer. On a downlink channel, after one mobile station starts to transmit, the other mobile stations may be reallocated to other channels immediately as well or the data may be transferred not until another mobile station starts to receive data on the same channel.

An object of the invention is further fulfilled with the idea of informing the network on a need to allocate a TBF also in the opposite data transfer direction. For example, when uplink TBF is allocated, also the downlink TBF is allocated even if no downlink data is to be transferred at the moment. This information can be transferred in a signalling message as a separate information element or in an information element of another purpose. The temporary data flows can also be allocated automatically in both data transfer directions (e.g. during a connection establishment phase), when the data is delay sensitive.

An object of the invention is further fulfilled with the idea of informing the network on whether the data to be transferred is delay sensitive. This information can be given to the network for example in a priority field included in a Quality of Service profile information element.

The present invention offers important advantages over prior art methods. With the present invention it is possible to use the packet channel resources very efficiently. Still, if the total capacity of the network is sufficient, it is possible to avoid the risk that there is no channel available when the passive data transfer period ends.

It is characteristic to a method according to the present invention for transferring a data flow by creating a connection on a packet radio service of a telecommunication system, wherein the data flow comprises at least one active data transfer period, that information is transferred between the mobile station and the network on whether after the active data transfer period a passive period starts or whether a connection release is allowed.

The invention also applies to a telecommunications system for transferring a data flow by creating a connection on a packet radio service, wherein the data flow comprises at least one active data transfer period, having the characteristic means for receiving information on whether after the active data transfer period a passive period starts or whether a connection release is allowed.

The invention also applies to a mobile station for transferring a data flow by creating a connection on a packet radio service to a cellular telecommunications system, wherein the data flow comprises at least one active data transfer period, comprising means for transferring information on whether after the active data transfer period a passive period starts or whether the connection release is allowed.

BRIEF DESCRIPTION OF THE DRAWINGS

In the following the invention is described in more detail by means of the attached drawings in which.

DETAILED DESCRIPTION

Figure 1A:
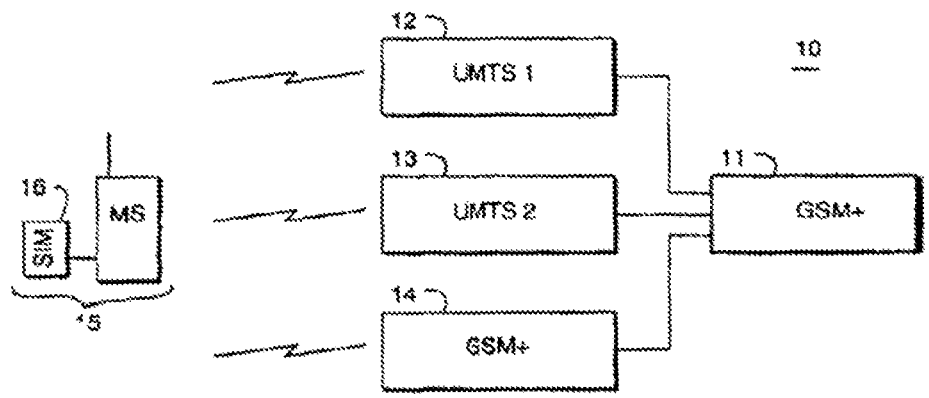
FIGS. 1A and 1B illustrate a prior art cellular communications system.
Figure 1B:
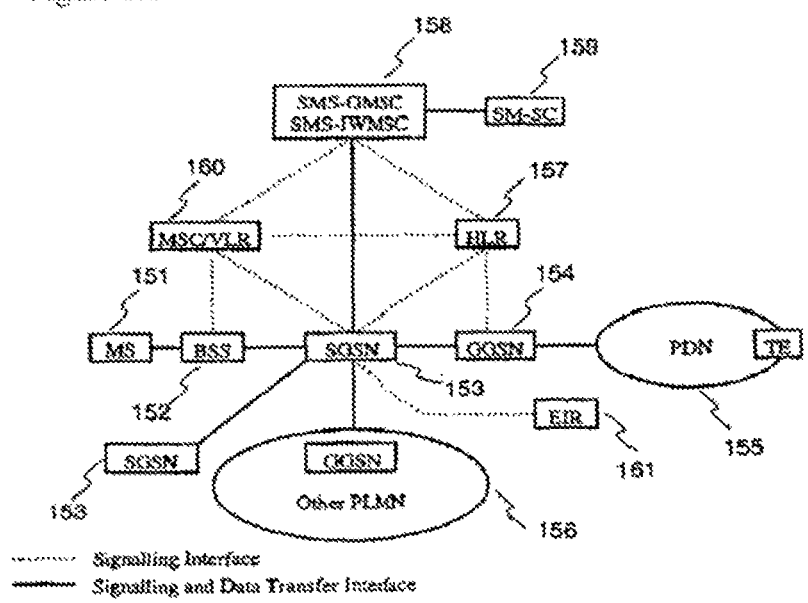
Figure 2:
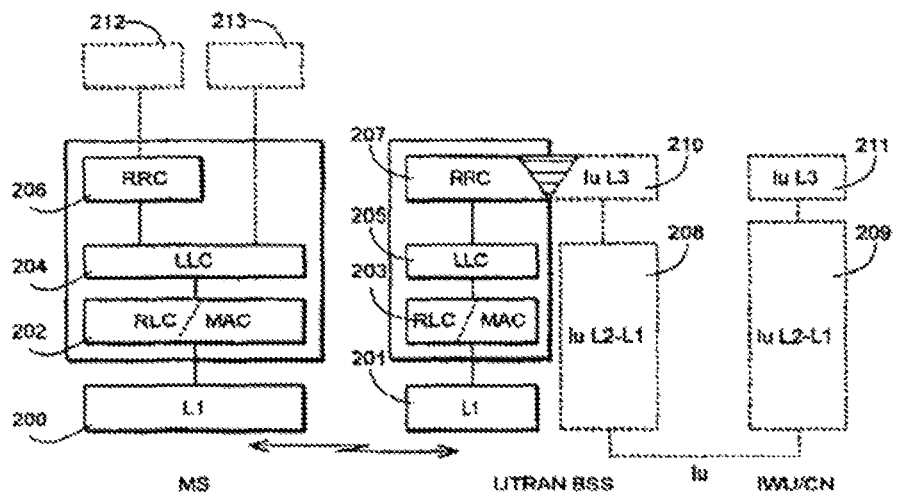
FIG. 2 illustrates protocol levels of a prior art cellular communications system.

FIGS. 1A, 1B and 2 were described above in the prior art description. In the following, first principles of indicating a delay sensitive data and of allocating resources is described using an embodiment in a GPRS system as an example. Next an example of placing the release information into the MAC header is described referring to FIGS. 3, 4A and 4B. Next the phases of the inventive method are described referring to FIGS. 5-9. Finally a mobile station and a cellular system according to the invention are shortly described referring to FIG. 10.

In an uplink resource allocation, a mobile station indicates to the network that it requires radio resources for delay sensitive data transfer. The network needs the information in order to assign sufficient radio resources for the mobile station to provide the required service level. The information may be provided to the network via one of the following ways, where some system-specific message denominations are used as examples with no intention to limit the applicability of the invention:

The mobile station sends a PACKET CHANNEL REQUEST message to the network, and the message has a specific type for delay sensitive data transfer;

CHANNEL REQUEST DESCRIPTION information element or other corresponding information element is included into a PACKET RESOURCE REQUEST message and the information element includes information indicating that delay sensitive data is to be transferred or;

A priority field or other field is included in the radio resource request message, such as a PACKET CHANNEL REQUEST or a PACKET RESOURCE REQUEST message, that is transmitted by the mobile station to the network and the field identifies unambiguously that delay sensitive data is to be transferred.

In addition to the information on that radio resources that are required for the delay sensitive data transfer, the radio request information may also include the following additional parameters that specify more accurately the required resources;

The number of required packet data channels;

The information on whether the communication is unidirectional or bidirectional. This makes the network able to determine whether the mobile station requires also downlink resources. By reserving downlink resources simultaneously with the uplink radio resources it is possible to avoid a situation where the mobile station would receive downlink data but the network is unable to reserve downlink radio resources at that moment;

The information on the number (N) of passive block periods. If the mobile station has no data to be transmitted to the network, the network may give the next N uplink sending permissions to some other mobile station/mobile stations. The mobile station or the network may define the value of this parameter or it may have a default value.

As the length of the PACKET CHANNEL REQUEST message is only 11 or 8 bits, it may be difficult to include the above parameters into the message. Therefore it may be preferable to use two phase access when requesting radio resources for delay sensitive data transfer, if a more accurate description of the requested radio resources is necessary.

There may also be default values for the channel request when one phase access is used. For example, when requesting radio resources for delay sensitive data transfer one packet data channel and only uplink radio resources could be reserved as a default. If there is a need to reserve several packet data channels the modification of the radio resources can then take place through an additional signalling procedure.

In a downlink resource allocation, the procedure starts when the network needs to transmit data to the mobile station that has no downlink radio resources assigned or when the mobile station requests the establishment of a downlink TBF during an uplink TBF establishment procedure. The network allocates sufficient radio resources based on the information that is attached to the packet data. The information includes an indication that radio resources are required for delay sensitive data transfer so that the network can assign sufficient radio resources in order to provide the required service level. For example, the delay sensitivity of the data may be indicated in a information element included into the quality of service (QoS) profile. Delay sensitivity of the data transfer may also be indicated in a new field in the QoS profile or in a new information element that is attached to the data sent from the network, eg. from a SGSN, to the BSS.

In addition the following parameters may be included into the information that is received from the SGSN in order to describe the required radio resources more accurately:

The number of required packet data channels;

The information on whether the communication is unidirectional or bidirectional. This makes the network able to determine whether the mobile station requires also uplink radio resources. By reserving downlink resources simultaneously with the uplink radio resources it is possible to avoid a situation where the mobile station would need to send uplink data but the network is unable to reserve uplink radio resources at that moment;

The information on the number (N) of passive block periods. If the mobile station has no data to be transmitted to the network, the network may give the next N uplink sending permissions to some other mobile station/mobile stations. The mobile station or the network may define the value of this parameter or it may have a default value.

Figure 3:
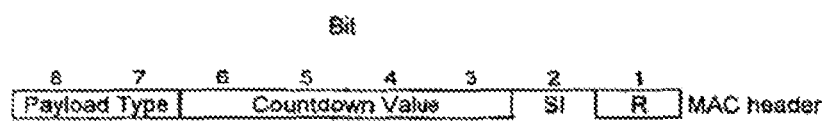
FIG. 3 illustrates a prior art MAC header in an uplink RLC data block.
Figure 4A:
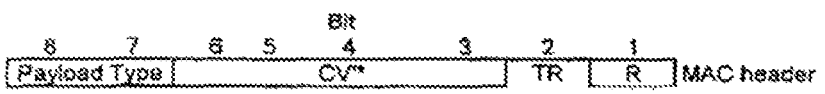
FIG. 4A illustrates a MAC header in an uplink RLC data block without a TBF release indication.

FIG. 3 describes a prior art MAC header in uplink RLC data block currently specified in [1]. In the header the Payload Type field indicates the type of data contained in remainder of the RLC/MAC block. The Countdown Value field CV is sent by the mobile station to allow the network to calculate the number of RLC data blocks remaining for the current uplink TBF. This was already discussed above.

The Stall Indicator (SI) bit indicates whether the RLC transmit window of the mobile station can advance, i.e. the RLC transmit window is not stalled, or whether it can not advance, i.e. the RLC transmit window is stalled. The mobile station sets the SI bit in all uplink RLC data blocks. In RLC unacknowledged mode SI shall always be set to '0'.

The Retry (R) bit indicates whether the mobile station transmitted the PACKET CHANNEL REQUEST message once or more than one time during its most recent channel access.

When delay sensitive data is transmitted from the mobile station to the network according to the invention, the RLC/MAC data block may include a field indicating if the RLC block is the last one of the connection or if it is not. This field is called TBF Release (TR) in this text. If the RLC block is the last one, the TR field is set to value "1", and the TBF is considered to be released. Otherwise the TR field is set to "0" and the network then considers the TBF to be open. The TR field may e.g. replace the stall indicator SI field, because when the RLC operates in unacknowledged mode the SI field is not used. The TR field may also be included in the CV field by replacing a part of it.

When delay sensitive data is transmitted to the network, the RLC/MAC data block includes information on whether the mobile station has more RLC data blocks to be transmitted or if the network may give next N uplink transmit permissions to other mobile stations. This information may also be provided to the network in the RLC/MAC header and the field is called "CV'" in this text. The CV' field may replace all or part of the CV field in the prior art specification.

When the mobile station transfers delay sensitive data to the network and the CV'.noteq.0 the network interprets it so that the mobile station has more data blocks to be transmitted and the network is thus able to assign also the next uplink transmit permissions for the same mobile station. When the CV' value is set to "0" the network interprets it so that the first mobile station has no more RLC data blocks to be transmitted at the time and the network may therefore give the next N uplink transmit permissions to some other mobile station/stations. However, in order to guarantee that the first mobile station transferring delay sensitive data does not need to wait too long for an uplink transmit permission the network gives at every N block period an uplink transmit period for the first mobile station. If the mobile station then has RLC data blocks to be transmitted, the mobile station includes TR and CV' fields in the RLC data blocks as described above. If the mobile station does not have data to be transmitted, to the network at the time, the mobile station may omit the uplink transmit permission or it may transmit a Packet Dummy Control Block or a signalling message.

If the downlink temporary block flow is preserved also when there is no data to be transmitted to the mobile station and if the network is unable to determine when to release the downlink TBF, the mobile station should tell the network when the downlink TBF can be released. This can be accomplished by introducing a bit in the RLC/MAC data block header that indicates whether the network is to release both uplink and downlink temporary block flows. The mobile station may also transmit a RLC/MAC control signalling message to the network indicating the release of downlink temporary block flow prior to the release of the uplink temporary block flow. It is also possible to have a timer function which would release the downlink temporary block flow after a predetermined time has passed from the latest transmission of downlink data. The network may contain a logical entity that is able to determine, when the TBF is to be released FIG. 4A describes an example of the MAC header in uplink RLC data block according to the invention, without including a downlink TBF release indication. The TBF Release (TR) indicates whether the mobile station transferring delay sensitive data requests the release of uplink TBF or not.

Figure 4B:
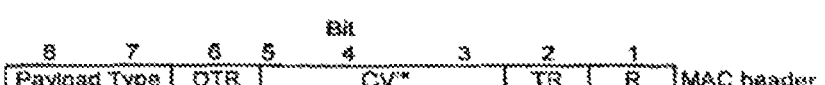
FIG. 4B illustrates a MAC header in an uplink RLC data block with a TBF release indication.

FIG. 4B describes an example of the MAC header in uplink RLC data block according to the invention, including Downlink TBF Release indication DTR in the bit 6 of the header. The downlink TBF release indicates whether the mobile station transferring delay sensitive data requests also the release of downlink TBF or not. The DTR field, if used, may be present in all uplink RLC data blocks thus occupying e.g. one Count Value CV' field bit. DTR field may actually be included into MAC header only when CV' field is set to '0' (actually three LSBs) and TR field is set to '1', thus leaving 4 bits for CV' field in normal operation.

The parameters according to the invention can be included into the current uplink RLC/MAC data block as described above, or a new RLC/MAC data block may be defined. If a new data block would be defined, the Payload Type may be used for identifying the type of the block.

Figure 5:
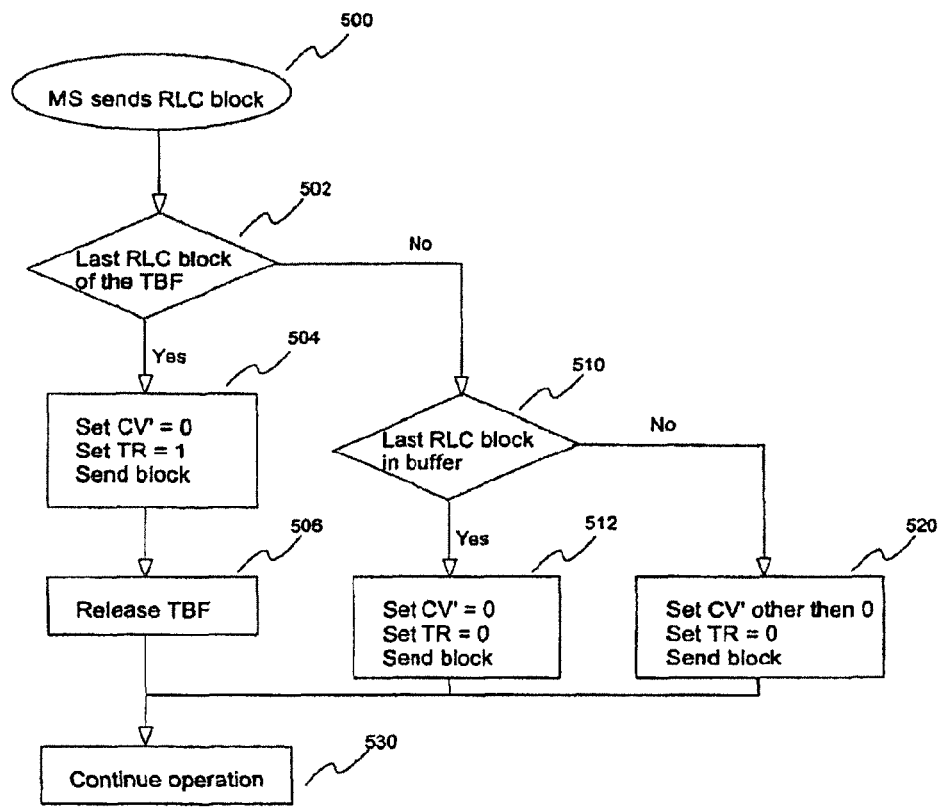
FIG. 5 illustrates a flow diagram for the transmission of the uplink RLC blocks.

FIG. 5 shows a flow diagram of the steps for transmitting a RLC block from a mobile station to the network, 500. The following parameters of a MAC header field are given as examples; many other ways of transferring the information can be applied. In step 502, the mobile station checks whether the RLC block to be transmitted is the last one in a data block of the TBF. If it is, the mobile station sets the parameters CV'=0 and TR=1 of the MAC header, step 504, and transmits the block. The parameter TR=1 means that the TBF can be released, step 506.

If in step 502 the RLC block is not the last one of the TBF, the mobile station checks in step 510, whether the RLC block is the last one in the buffer. If it is, the mobile station sets the parameters CV'=0 and TR=0 in step 512 and transmits the block. This means that the data flow starts a passive period, but the TBF is not released. If the RLC block is not the last one in the buffer of the mobile station, the parameters are set CV'=other than 0 and TR=0 in step 520, and the block is transmitted. The CV' value can be the number of the remaining blocks in the buffer, if the number is small enough to be expressed in CV'. For example, the CV' can be used as the CV parameter in the current specification (ETSI GSM 06.60).

After the block is transmitted in any of the previous steps, the operation is continued from step 500, when there is a data block in the buffer to be transmitted, 530.

Figure 6:
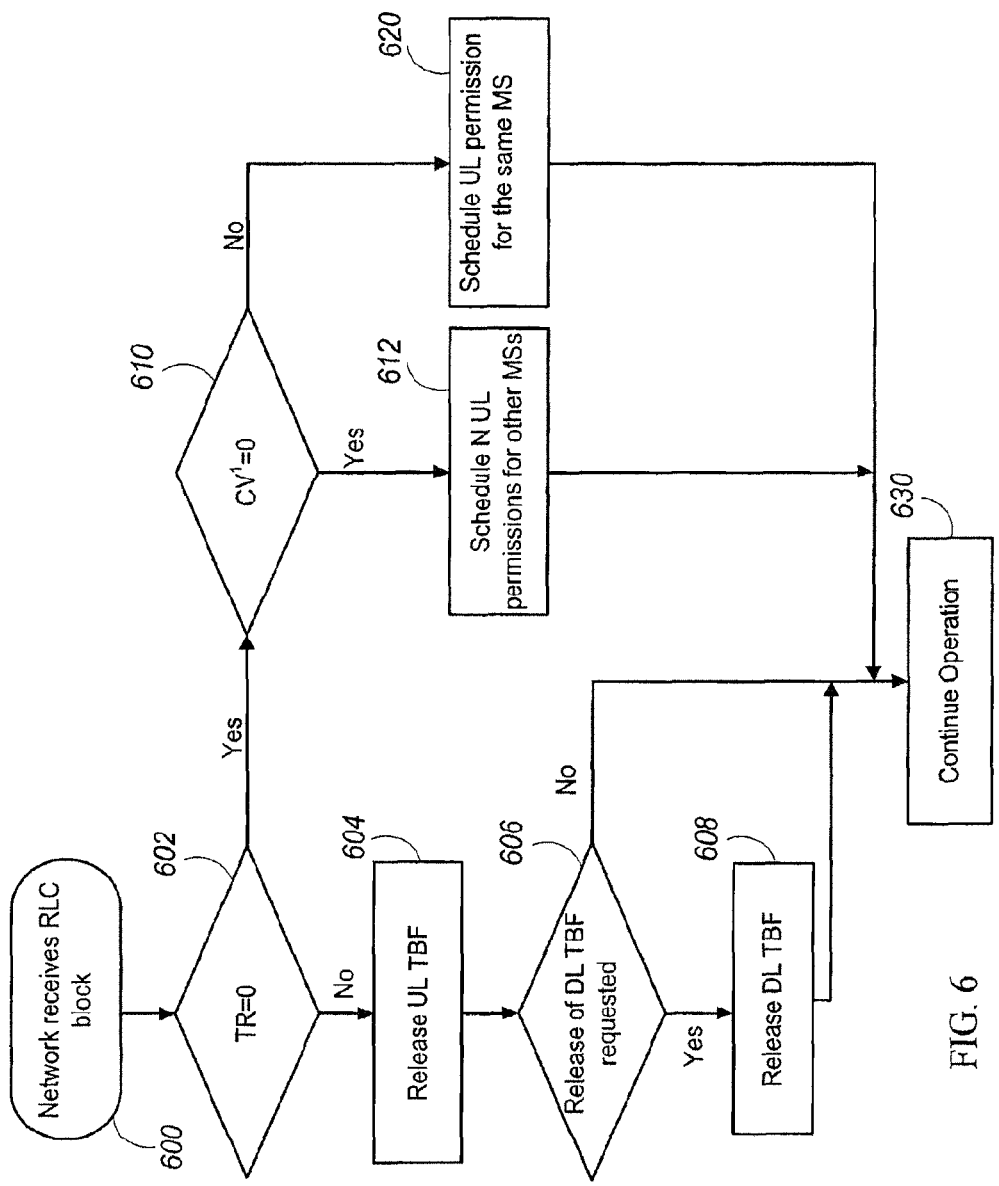
FIG. 6 illustrates a flow diagram for the reception of the uplink RLC blocks.

FIG. 6 shows a flow diagram of the steps for receiving a RLC block from a mobile station to the network, 600. In step 602 the network checks the value of the TR parameter from the received RLC block. If the parameter TR=1, the uplink TBF is released, step 604. Next, the release of the downlink TBF depends on whether it is requested, steps 606 and 608.

If in step 602 the parameter TR=0, the network next checks the value of the parameter CV', step 610. If CV'=0, this means that there is a passive transfer period in the data flow, and the packet data channel may be scheduled for another mobile station (other mobile stations), step 612. If, however, the parameter CV' is different from 0, the channel permission is scheduled for the same mobile station, step 620.

After the block is received and processed in the previous steps, 630, the operation is continued from step 600, when there is a new data block received.

Figure 7:
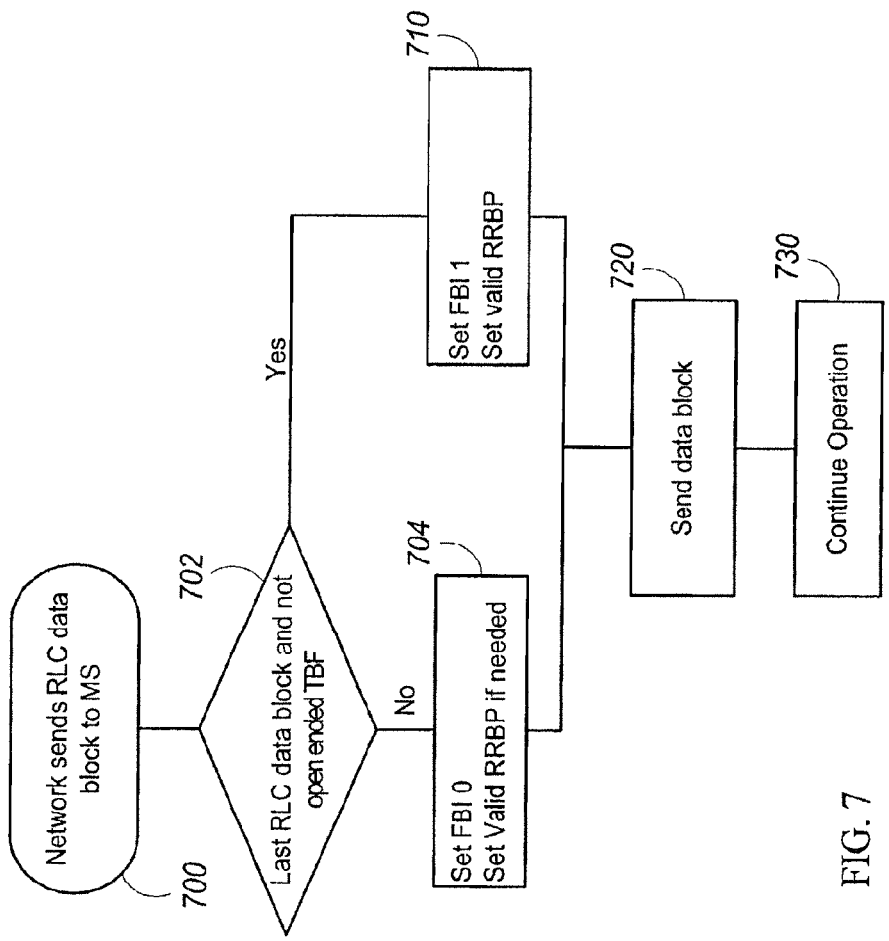
FIG. 7 illustrates a flow diagram for the transmission of the downlink RLC blocks.

FIG. 7 shows a flow diagram for the transmission of the RLC blocks from the network to the mobile station, 700. In step 702, the network checks whether the RLC block to be transmitted is the last one in a data block of the TBF. If it is, the mobile station sets the parameter Final Block Indicator FBI=1. It also sets a valid Relative Reserve Block Period (RRBP) field, step 710, and transmits the block, step 720. The parameter FBI=1 means that the current block is the last RLC block in the temporary block field and thus the TBF can be released. The allocation of a RRBP field means that one uplink transmit block is allocated for the receiving mobile station so that the mobile station can send a control message to the network.

If in step 702 the RLC block is not the last one of the TBF, the network sets the parameter FBI=0 in step 704. This means that the data flow may or may not start a passive period, but the TBF is not released. The network also sets a valid RRBP if needed, step 704.

After this, the network transmits the data block, step 720. After the block is transmitted in any of the previous steps, the operation is continued from step 700, when there is a data block in the buffer to be transmitted, 730.

Figure 8:
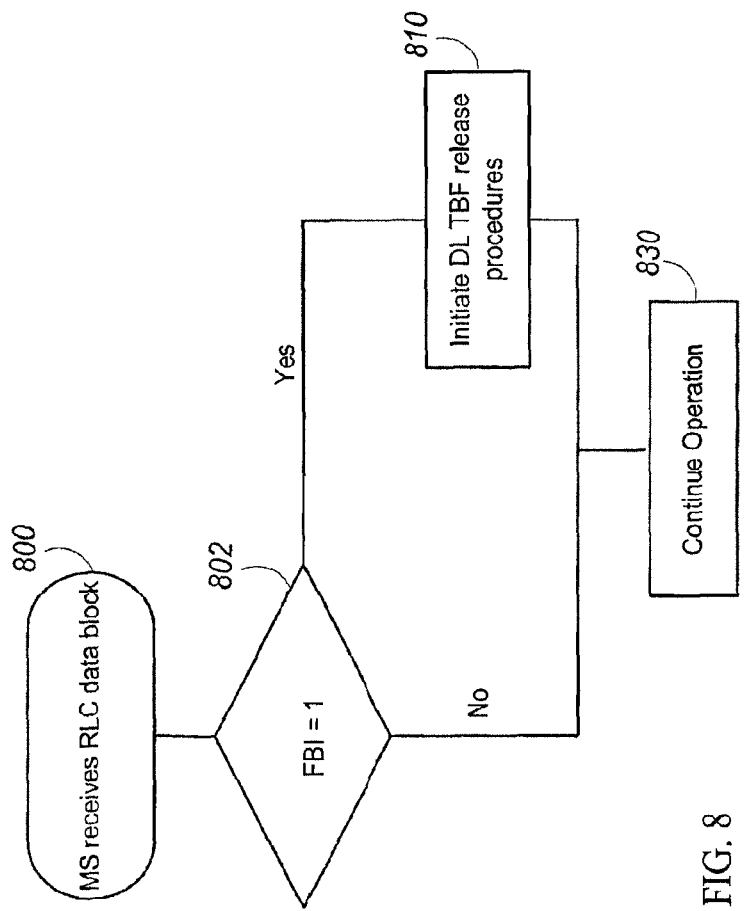
FIG. 8 illustrates a flow diagram for the reception of the downlink RLC blocks.

FIG. 8 shows a flow diagram of the steps for receiving a RLC block from the network to a mobile station, 600. In step 602 the mobile station checks the value of the FBI parameter from the received RLC block. If the parameter FBI=1, the downlink TBF release procedure is initiated, step 810. If in step 802 the parameter FBI.noteq.1, this means that the mobile station continues the receive procedure of the present TBF, step 830.

Figure 9:
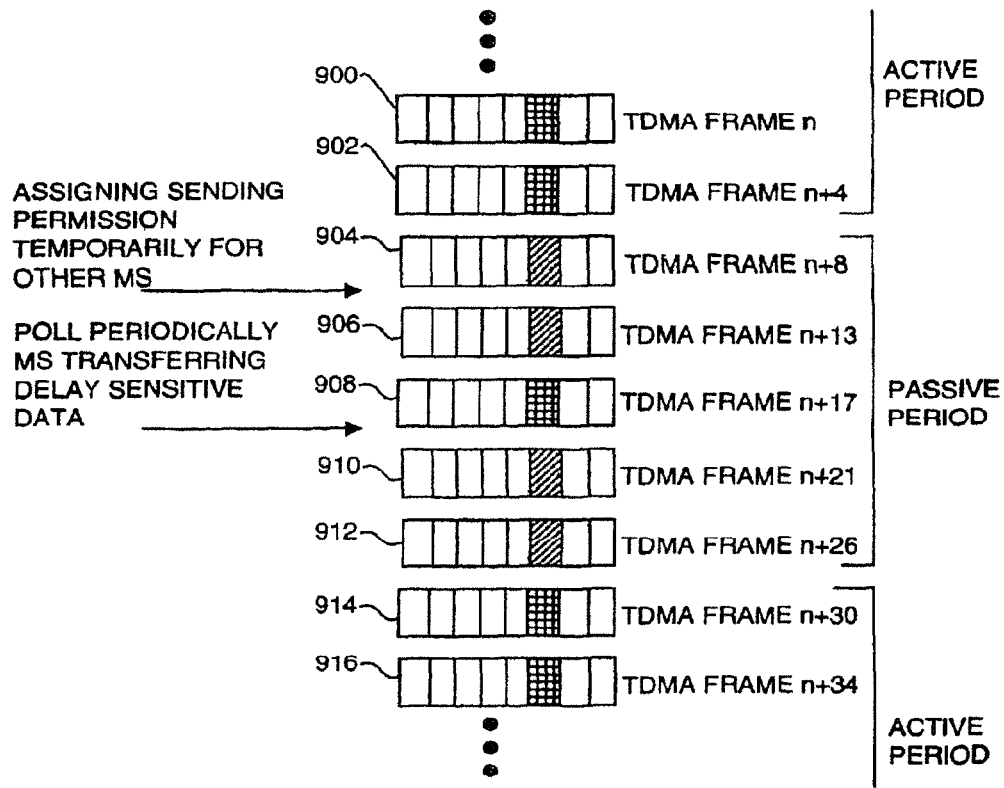
FIG. 9 illustrates TDMA frames of active and passive periods of a delay sensitive data flow and FIG. 10 illustrates a block diagram of a mobile station according to the invention.

FIG. 9 shows successive TDMA frames, in which time slot 5 is used for a packet data channel. In the TDMA frames 900 and 902, the packet data channel is allocated for an active connection of delay sensitive data transfer. As the active period changes into a passive (silent) period, the network assigns a transmit permission to a second connection in frame 904. During the passive period, frames 904-912, the network also periodically assigns sending permissions to the mobile station of the first connection for a channel request, frame 908. As the active period starts again, frames 914, 916, the permission for an uplink data transfer may be given back to the first connection. If the second connection is transferring delay sensitive data as well, then one of the connections may be reallocated to another packet data channel at the beginning or at the end of the passive period.

When the same packet data channel is allocated for several passive connections all the other delay sensitive users can be reallocated to other packet data channels when one of them starts transmitting. Alternatively they may wait for an uplink transmission permit on the same packet data channel. In practice the reallocation may be carried out by sending a signalling message, such as a PACKET UPLINK ASSIGNMENT, containing new packet data channel allocation to each mobile station being reallocated. Another alternative is to send a single signalling message, such as a PACKET REALLOCATION, containing new packet data channel allocations to all/some mobile stations being reallocated. Using only one signalling message leaves more free radio capacity for other purposes.

When the network receives delay sensitive data for a mobile station, the network reserves as much downlink packet data channel capacity to the mobile station as is needed. This naturally requires that the network has the needed resources available. This may mean that the packet data channel is dedicated temporarily for a single mobile station in the downlink direction. During the passive periods in downlink delay sensitive data transfer the network may assign downlink transmission permissions to other mobile stations and thus the network can transmit data to other mobile stations. In order to prevent a situation where the network receives delay sensitive data to more than one mobile station simultaneously on the same packet channel/channels and thus would have to block all but one, the network may distribute the other mobile stations using delay sensitive data transfer to other packet data channels. The distribution can be made using the following mechanisms:

Early downlink assignment: When the network receives delay sensitive data for a mobile station, it reallocates the other delay sensitive data users residing on the same packet data channel. Delay insensitive data users may be reallocated to other packet data channels or alternatively they will wait for a transmission permit on the same packet data channel. The network transmits a signalling message, such as a PACKET DOWNLINK ASSIGNMENT, containing new packet data channel allocations to all/some mobile stations being reallocated.

Late downlink assignment: When the network receives delay sensitive data for a mobile station, it does not immediately reallocate the other mobile stations residing on the same packet data channel. Only when the network receives delay sensitive data for a mobile station and the network is already transferring delay sensitive data to some other mobile station on the same packet data channel, the network assigns a new packet data channel to the mobile station. The new packet data channel is assigned, e.g. by sending a PACKET DOWNLINK ASSIGNMENT signalling message to the mobile station.

The network should control that the delay sensitive data does not need to queue too long for a downlink transmission permit. The network should also control that the signalling messages related to the other temporary block flows of other mobile stations do not excessively occupy the packet data channel. This may be accomplished by giving the same or a higher priority to the delay sensitive data transfer compared to signalling messages of other temporary block flows.

When the network has temporarily no delay sensitive data to be transmitted, it preserves the temporary block flow and does not set the FBI field to value "1" after transmitting the last buffered RLC data block. The mobile station controls the termination of the downlink TBF or the network may contain a logical entity that is able to determine, when the TBF is to be released.

Figure 10:
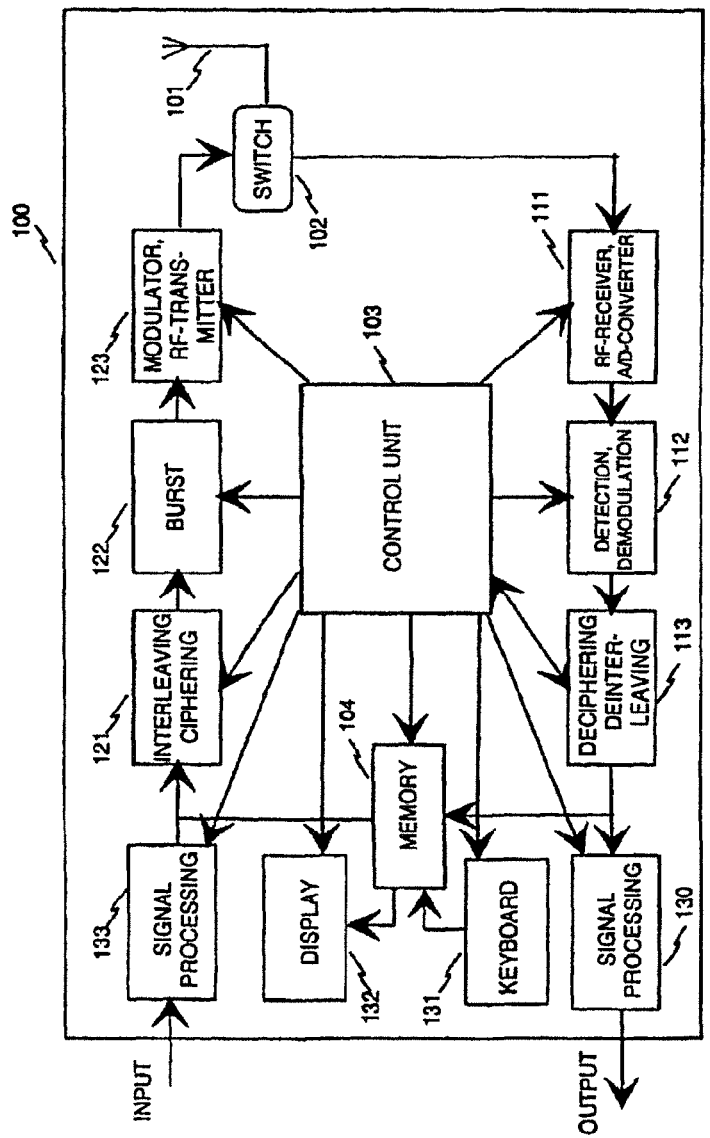

FIG. 10 shows a block diagram of a mobile station 100 according to the invention. The mobile station comprises an antenna 101 for receiving radio frequency signals from base stations. The received RF signal is led with the switch 102 to the RF receiver 111, in which the RF signal is amplified and converted digital. Thereafter the signal is detected and demodulated in block 112. The type of the demodulator depends on the system radio interface. It may include a QAM demodulator, or a RAKE combiner. The deciphering and deinterleaving is made in block 113. After this, the signal is processed according to the signal type (speech/data). The received packet data can be converted acoustic with a loudspeaker, or the received packet data can be linked to a separate device, such as a video monitor. A control unit 103 controls the receiver blocks according to a program that is stored into a memory 104.

In the transmission of a signal, the control unit controls the signal processing block 133 according to the type of signal. Block 121 further makes the ciphering and interleaving for the signal. Bursts are formed from the coded data in block 122. The bursts are further modulated and amplified in block 123. The RF signal is led to the antenna 101 via the switch 102 for transmission. The processing and transmission blocks are also controlled by the control unit. Especially the control unit controls the transmission blocks in such a way that the MAC header parameters of the RLC block are coded and transmitted according to the present invention. Also the channel selection is controlled by the control unit in such a way that the assigned packet data channel is used according to the invention.

In general, the processing of information in a telecommunication device takes place in an arrangement of processing capacity in the form of microprocessor(s) and memory in the form of memory circuits. Such arrangements are known as such from the technology of mobile stations and fixed network elements. To convert a known telecommunication device into a telecommunication device according to the invention it is necessary to store into the memory means a set of machine-readable instructions that instruct the microprocessor(s) to perform the operations described above. Composing and storing into memory of such instructions involves known technology which, when combined with the teachings of this patent application, is within the capabilities of a person skilled in the art. On the network side, the features according to the invention can be implemented e.g. in the Packet Control Unit PCU that assigns e.g. uplink and downlink sending permissions for mobile stations. The packet control unit may be located e.g. in the Base Tranceiver Station BTS, Base Station Controller BCS or Serving GPRS Support Node SGSN.

Above, an exemplary embodiment of the solution according to the invention has been described. The principle according to the invention can naturally be modified within the frame of the scope defined by the claims, for example, by modification of the details of the implementation and ranges of use.

The information on the following data transfer period can be transferred on the packet data channel, or it may as well be transferred in a signalling message on some control channel such as SACCH (Slow Associated Control CHannel) of the GSM system. Thus also the parameters in a MAC header field of an RLC block are given as examples only; many other signalling possibilities exist for transferring the corresponding information. Especially the use of the SACCH or a comparable control channel will enable the transmission of such information at any time, irrespective of whether there is currently an active period or not.

The invention is not in any way restricted to transferring speech data, but it can be applied in a packet radio service where any data flows with passive and active periods are transferred. One example is video data transfer, wherein a moving/changing video image would require an active data flow and still video image periods which would not require data transfer for the image update.

What is claimed is:

1. A method comprising:
   receiving data from a mobile station over a wireless network during a first data transfer period using an uplink temporary block flow (TBF); and
   maintaining the uplink TBF during a temporary period after the first data transfer period, wherein the temporary period occurs when the mobile station does not send data over the uplink TBF to the wireless network.

2. The method of claim 1, wherein the data is received on a packet data channel between the mobile station and the wireless network.

3. The method of claim 1, further comprising transmitting uplink transfer permission to the mobile station during a passive period.

4. The method of claim 1, further comprising:
   allocating a first connection on a packet data channel to a first mobile station;
   receiving data from the first mobile station over the first connection during a data transfer period;
   determining that a temporary period exists on the first connection during which the first connection is inactive;
   allocating a second connection on the packet data channel to a second mobile station; and
   receiving data from the second mobile station via the second connection while maintaining the first connection during the temporary period.

5. The method of claim 4, further comprising reallocating the second connection to another packet data channel in response to the first connection becoming active again.

6. The method of claim 1, further comprising allocating resources for packet data transfer of the opposite data transfer direction when allocating data transfer resources for a first direction of packet data transfer.

7. The method of claim 1, wherein the received data is at least one of a media access control (MAC) data block, a radio link control (RLC) data block, or a RLC/MAC data block.

8. The method of claim 1, wherein the wireless network does not receive radio link control (RLC) data from the mobile station over the uplink TBF during the temporary period.

9. A system comprising:
   a transceiver configured to receive data from a mobile station over a wireless network during a first data transfer period using an uplink temporary block flow (TBF) on a packet data channel between the mobile station and wireless network; and
   circuitry configured to maintain the uplink TBF during a temporary period after the first data transfer period, wherein the temporary period occurs when the wireless network does not receive data over the uplink TBF from the mobile station.

10. The system of claim 9, wherein the circuitry is further configured to exchange information with the mobile station using at least one data channel or control channel to cause the mobile station to operate in a mode under which the uplink TBF is maintained or preserved during a passive period.

11. The system of claim 9, wherein the circuitry is further configured to cause transmission of uplink transfer permission to the mobile station during a passive period.

12. The system of claim 9, wherein the circuitry is further configured to:
   allocate a first connection on a packet data channel to a first mobile station;
   receive data from the first mobile station over the first connection during a data transfer period;
   determine that a temporary period exists on the first connection during which the first connection is inactive;
   allocate a second connection on the packet data channel to a second mobile station; and
   receive data from the second mobile station via the second connection while maintaining the first connection during the temporary period.

13. The system of claim 12, wherein the circuitry is further configured to reallocate the second connection to another packet data channel in response to the first connection becoming active again.

14. The system of claim 9, wherein when allocating data transfer resources for a first direction of packet data transfer, resources are also allocated for packet data transfer of the opposite data transfer direction.

15. The system of claim 9, wherein the received data is at least one of a media access control (MAC) data block, a radio link control (RLC) data block, or a RLC/MAC data block.

16. The system of claim 9, wherein the wireless network does not receive radio link control (RLC) data over the uplink TBF from the mobile station during the temporary period.

17. An apparatus comprising:
- a communication interface configured to receive data from a mobile station over a wireless network during a first data transfer period using an uplink temporary block flow (TBF); and
- a processor configured to maintain the uplink TBF during a temporary period after the first data transfer period, wherein the temporary period occurs when the mobile station does not send data over the uplink TBF to the wireless network.

18. The apparatus of claim 17, wherein the data is received on a packet data channel between the mobile station and the wireless network.

19. The apparatus of claim 17, wherein the communication interface is configured to transmit uplink transfer permission to the mobile station during a passive period.

20. The apparatus of claim 17, wherein the processor is further configured to allocate a first connection on a packet data channel to a first mobile station and the communication interface is configured to receive data from the first mobile station over the first connection during a data transfer period.

\* \* \* \* \*